(12) United States Patent
Ozawa et al.

(10) Patent No.: US 6,922,265 B1
(45) Date of Patent: Jul. 26, 2005

(54) IMAGE READING DEVICE

(75) Inventors: Yoshio Ozawa, Kanagawa (JP);
Mitsuhiko Serizawa, Kanagawa (JP);
Toshiyuki Inoue, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/544,565

(22) Filed: Apr. 6, 2000

(30) Foreign Application Priority Data

Apr. 8, 1999 (JP) .......................................... 11-100778

(51) Int. Cl.[7] ................................................ H04N 1/04
(52) U.S. Cl. ...................... 358/498; 358/487; 358/403; 358/496; 382/132; 382/506
(58) Field of Search ................................ 358/498, 497, 358/505, 506, 512, 515, 518, 474, 302, 403, 487, 496, 301, 494; 382/132, 506

(56) References Cited

U.S. PATENT DOCUMENTS

| | | | | |
|---|---|---|---|---|
| 4,727,399 A | * | 2/1988 | Matsumoto | .................. 355/41 |
| 4,797,712 A | * | 1/1989 | Hayashi | ........................ 355/38 |
| 5,107,296 A | * | 4/1992 | Ozawa | ......................... 355/28 |
| 5,592,258 A | * | 1/1997 | Hashizume et al. | .......... 355/41 |
| 6,074,108 A | * | 6/2000 | Ohwaki | ....................... 396/564 |
| 6,324,345 B1 | * | 11/2001 | Enomoto | ..................... 396/311 |

* cited by examiner

*Primary Examiner*—Kimberly A. Williams
*Assistant Examiner*—Negussie Worku
(74) *Attorney, Agent, or Firm*—Sughrue Mion, PLLC

(57) ABSTRACT

A line CCD scanner includes a photo film passageway in which developed photo film is positioned. A light source illuminates an image in the photo film positioned in the photo film passageway. A line CCD reads the image being illuminated. A mask member is secured to the photo film passageway. The image is positioned at the mask member. A mask slit is formed in the mask member, for directing light from the light source toward the photo film. The mask slit has a small width with reference to a predetermined direction. Furthermore, a protrusion portion is disposed on the mask member to extend in the width direction of the photo film, provided with the mask slit formed in a middle thereof, for flexing the photo film in the longitudinal direction to remove flexing in the width direction.

21 Claims, 11 Drawing Sheets

IMAGE READING DEVICE

BACKGROUND OF THE INVENTION

1. Field of the Invention

The present invention relates to an image reading device. More particularly, the present invention relates to an image reading device for reading image information from photo film by use of CCD or the like.

2. Description Related to the Prior Art

There is a known image reading device, such as a scanner, which reads image information from developed photo film by use of CCD (charge coupled device), and processes the image information digitally. In combination with this, a printer is operated to record the image on to photographic paper or the like according to the image information. In the scanner, a light passing opening is formed in a photo film passageway. Light from a light source is passed through the light passing opening, and caused to illuminate the photo film. Light transmitted through the photo film is picked up by the CCD, by which the image information is read.

In addition to the image information, the CCD reads various bar codes and other information arranged on longitudinal edges of the photo film. It is noted that perforations are formed in the photo film and arranged at a regular pitch for the purpose of the photo film advance and positioning of a frame of an image. The perforations pass a position of the CCD in the course of the reading of the CCD for the image information, photo film type information or the like. In response to the passage of the perforations, the light passed through the perforations becomes an excessively high amount as a part of the light coming incident upon the CCD. Thus, it is necessary to lower the amount of the light at the perforations for avoiding saturation of an output of the CCD even with the light passed through the perforations. Japanese Patent Application No.09-276097 discloses a suggestion in connection with this problem. A light-passing glass plate is used, and is provided with an ND filter for reducing light in the position opposed to the perforations.

However, the prior art has a problem in that dust stuck on the photo film is likely to become stuck to the light-passing glass plate. The dust is read by the CCD clearly, to cause streak or noise in the image information being read.

SUMMARY OF THE INVENTION

In view of the foregoing problems, an object of the present invention is to provide an image reading device in which image reading is protected from influences of dust or the like, and dust can be eliminated easily.

In order to achieve the above and other objects and advantages of this invention, an image reading device includes a photo film passageway in which developed photo film is positioned. A light source illuminates an image in the photo film positioned in the photo film passageway. An image sensor reads the image being illuminated. A mask member is secured to the photo film passageway, at which the image is positioned. A mask opening is formed in the mask member, for directing light from the light source toward the photo film.

In a preferred embodiment, the mask opening is a mask slit having a small width with reference to a predetermined direction.

The mask member is removably secured to the photo film passageway.

The mask slit extends in a main scan direction, and the predetermined direction is a sub scan direction perpendicular to the main scan direction. The image sensor includes at least one photo sensor array, extending in the main scan direction, including plural photo sensors, for reading the image being illuminated line by line. Furthermore, a feed mechanism conveys one of the photo film and the photo sensor array relative to remainder thereof in the sub scan direction, whereby the image is read entirely.

Furthermore, a photo film carrier has the photo film passageway defined therein, for supporting the photo film. The mask member is secured to the photo film carrier.

The sub scan direction is a longitudinal direction of the photo film. Furthermore, first and second protrusion portions are disposed to protrude from the mask member, extended so that the mask slit is disposed therebetween, for pushing the photo film to position the image with reference to the photo sensor array.

The photo film carrier includes a carrier base member, disposed nearer to the light source, and provided with the mask member secured thereto. A carrier cover member covers the carrier base member, the photo film passageway being defined between the carrier cover member and the carrier base member. Furthermore, a diffuser plate is secured to the carrier base member, for diffusing the light directed from the light source toward the mask member.

Furthermore, a carrier opening is formed in the carrier base member, and has the diffuser plate secured thereto. The mask member is secured to the diffuser plate. A passage recess is formed in the mask member to retreat from one face thereof, extended to the photo film passageway, for guiding the photo film in contact with an inner face thereof. The first and second protrusion portions protrude from the inner face of the passage recess.

The first and second protrusion portions have a curved surface inclined to increase a height thereof toward the mask slit.

Furthermore, a retainer member removably retains the mask member to the diffuser plate.

The retainer member is secured to one of the diffuser plate and the mask member, for retention by magnetic attraction of one portion of a remaining one of the diffuser plate and the mask member.

Furthermore, at least one positioning hole is formed in one of the carrier base member and the mask member. At least one positioning pin is disposed to protrude from a remaining one of the carrier base member and the mask member, fitted in the positioning hole, for positioning the mask member on the carrier base member.

Furthermore, a retainer member retains the diffuser plate removably to the carrier base member.

Furthermore, a retainer recess is formed in one of the diffuser plate and the carrier base member. The retainer member is secured to a remaining one of the diffuser plate and the carrier base member, shiftable toward and away from the retainer recess, for pushing an inside of the retainer recess upon setting of the diffuser plate on the carrier base member, to retain the diffuser plate.

In another preferred embodiment, a fastening member immovably fastens the diffuser plate to the carrier base member, the fastening member being separable by external operation, and allowing removal of the diffuser plate.

The light source is disposed under the photo film passageway, the diffuser plate and the mask member are disposed to define a predetermined space therebetween, and the mask slit guides and eliminates dust on the photo film.

The photo film is a selected one of at least first and second types. The mask member is a selected one of at least first and second mask members associated with respectively the first and second types, and secured to the photo film passageway selectively.

The first and second types have widths different from one another, and the first and second types have the mask slit with a length different therebetween.

Furthermore, first and second test charts are disposed at respectively first and second ends of the mask slit, and have a test pattern common therebetween. The image sensor picks up the first and second test charts, for obtaining first and second pick-up information. A control unit compares a difference between the first and second pick-up information with a predetermined limit, detects abnormality in an orientation of the mask member on the carrier base member if the difference between the first and second pick-up information is more than the predetermined limit, and generates an alarm signal.

Furthermore, a pick-up lens focuses light from the image on the photo sensor array. The first and second test charts are auto focus charts, the test pattern is an auto focus pattern adapted to focusing of the pick-up lens.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
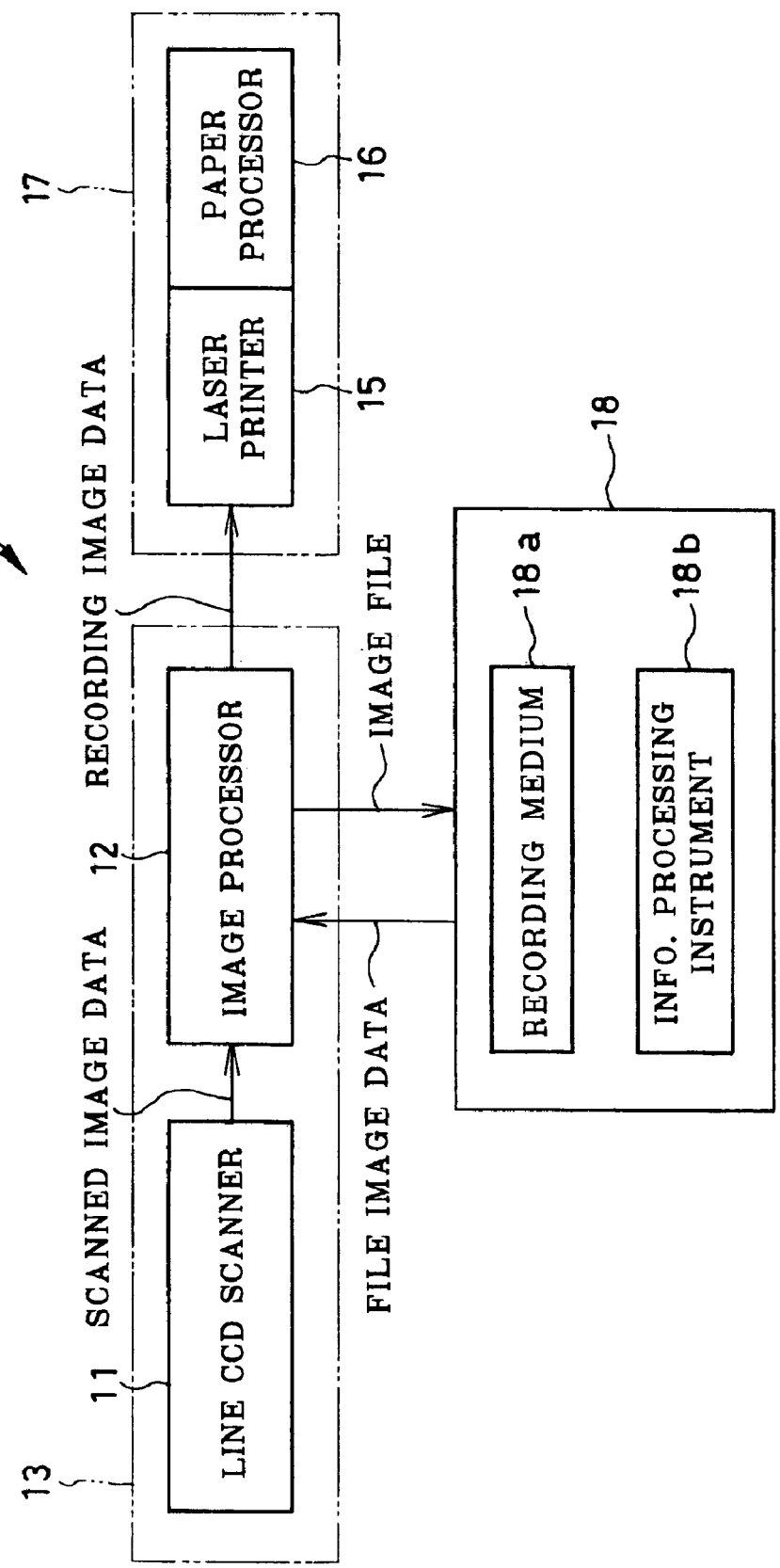
FIG. 1 is a block diagram illustrating a digital laboratory system including a line CCD scanner of the present invention.

A digital laboratory system 10 according to the present invention is described first. In FIG. 1, the digital laboratory system 10 is constituted by an input apparatus 13 and output apparatus 17. The input apparatus 13 includes a line CCD scanner 11 and image processor 12. The output apparatus 17 includes a laser printer 15 and paper processor 16.

The line CCD scanner 11 as an image reading device includes a line CCD and reads images recorded in developed photo film. There are various types of the photo film to read, including 135 type, IX 240 type, 110 type, Brownie photo film and the like. Examples of Brownie photo film are 120 type and 220 type. Of course, a reversal photo film can be read.

The image processor 12 as control unit subjects the image information being read to image processing for corrections and the like. The image processor 12 outputs the processed image data to the laser printer 15 as recording image data. Also, the image processor 12 outputs the processed image data to an external apparatus 18 as an image file. For example, the image processor 12 sends it to a recording medium 18a such as a memory card, CD ROM and the like, or transmits it to an information processing instrument 18b by use of a telecommunication line.

The laser printer 15 includes laser light sources for red, green and blue and a modulator. Laser from respectively the laser light sources is modulated by the modulator according to recording image data. Photographic paper is scanned and exposed by the modulated laser, to record an image to the photographic paper. The paper processor 16 subjects the photographic paper after the exposure to processes of color development, bleaching/fixing, water washing and drying to process it for development.

Figure 2:
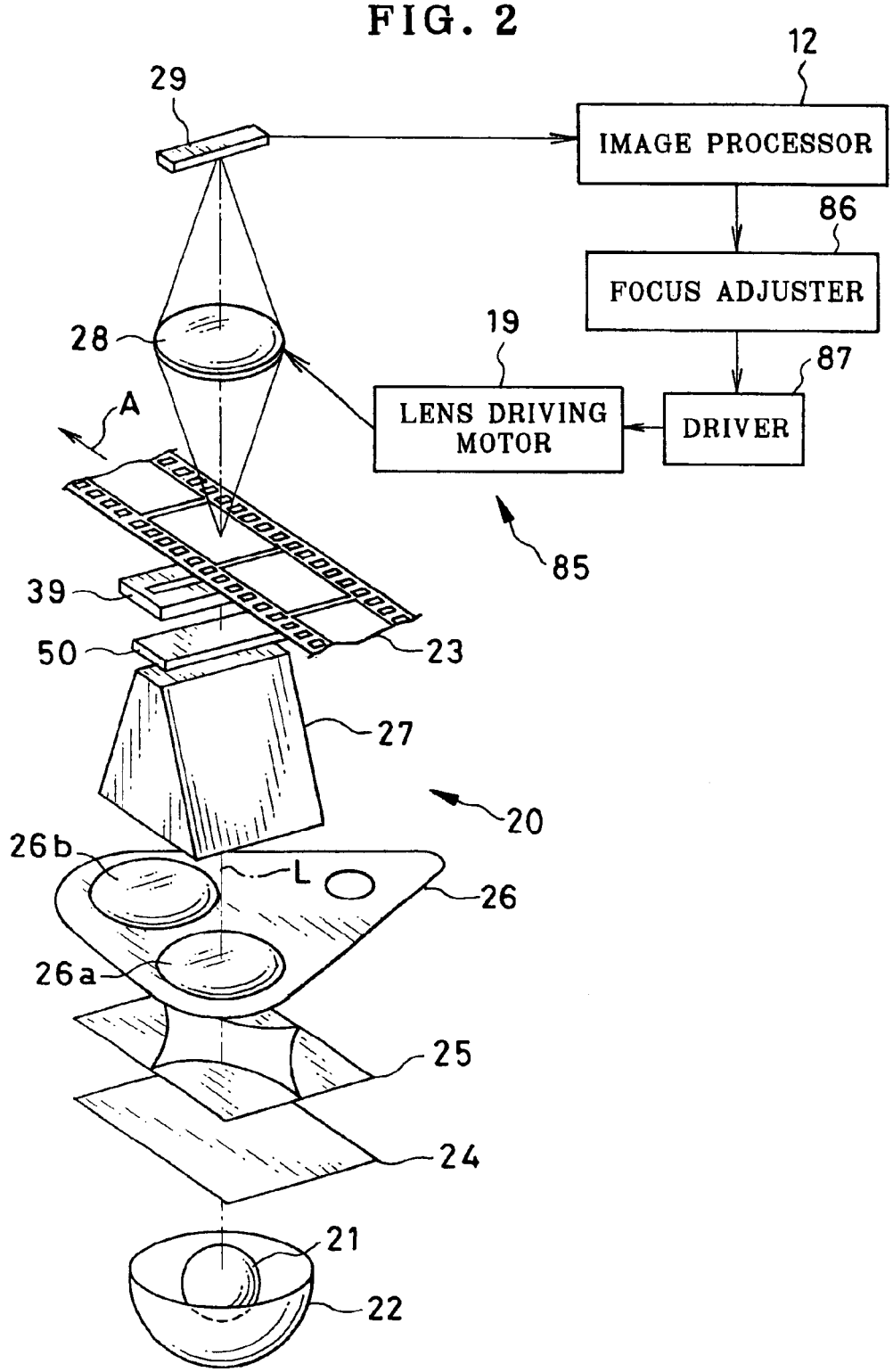
FIG. 2 is an explanatory view in a perspective and a block diagram, illustrating the line CCD scanner.

FIG. 2 illustrates a construction of an optical system in the line CCD scanner 11 which includes a photo film carrier 20. A light source 21 includes a metal halide lamp, halogen lamp or the like. A reflector 22 is shaped to have a focal point at which the light source 21 is positioned. The reflector 22 is produced from material through which infrared (IR) rays are transmissible, and has a reflection surface shaped parabolically. Light emitted by the light source 21 is reflected by the reflector 22, and directed toward developed photo film 23.

In a path L of light emitted from the light source 21, there are arranged an infrared (IR) cut filter 24, light regulating plate 25, balancing filter unit 26 and light diffuser box 27 in sequence. The light regulating plate 25 is movable with reference to the light path L to change its position of insertion to the light path L for adjusting an amount of light. The balancing filter unit 26 includes a negative film balancing filter 26a and reversal film balancing filter 26b for adjusting color temperature. One of those is inserted in the light path L selectively.

A pick-up lens unit 28 and line CCD 29 as image sensor are serially arranged in the light path L on the side opposite to the light source 21 with reference to the photo film 23. The pick-up lens unit 28 focuses an image recorded in the photo film 23 on to a light receiving surface of the line CCD 29. In FIG. 2, a single lens element is depicted as the pick-up lens unit 28. Of course, the pick-up lens unit 28 may be a zoom lens or other lens assemblies including plural lens elements. A lens driving motor 19 drives the pick-up lens unit 28 to move in a direction of the optical axis L in a small range, and causes the pick-up lens unit 28 to focus an image in the photo film 23 to the line CCD 29.

The line CCD 29 is constituted by arranging trains of CCD cells of red, green and blue in the conveying direction A of the photo film 23 indicated in FIG. 2. Each train of the CCD cells includes CCD cells arranged in the width direction of the photo film. A main scan direction of image reading is the arranging direction of the CCD cells in each train. A sub scan direction of the image reading is the conveying direction of the photo film 23. Note that, in the line CCD 29, the three trains of the CCD cells are arranged at a constant pitch in the conveying direction of the photo film 23. Time differences occur in the detection of the red, green and blue color components even for one pixel. In the present embodiment, detecting points of time of photometric signals are delayed with delay times different between the colors. Therefore, the red, green and blue photometric signals of one pixel are output simultaneously by the line CCD.

Figure 3:
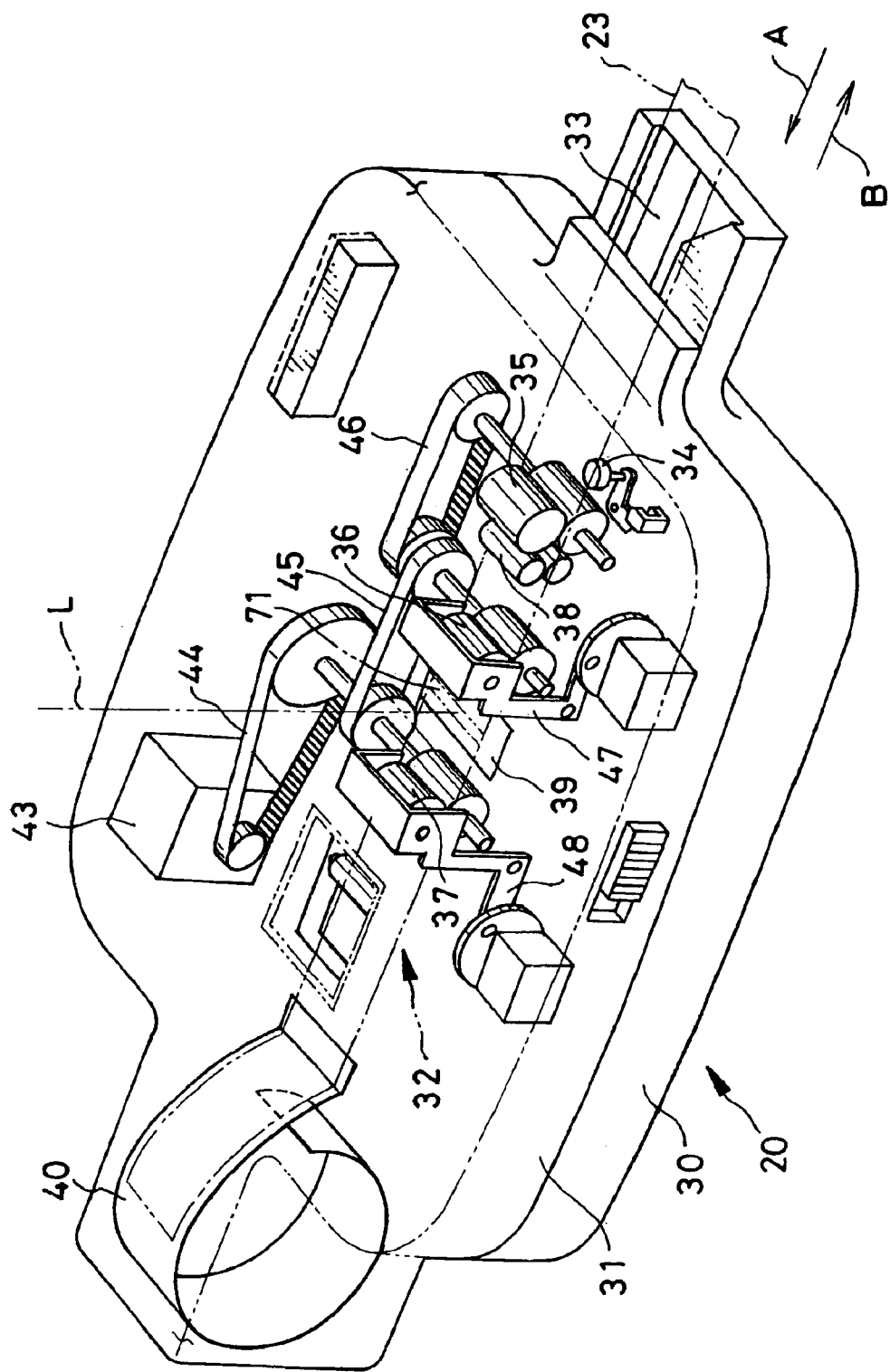
FIG. 3 is an explanatory view in a perspective, illustrating a photo film carrier for use with the line CCD scanner.

FIG. 3 illustrates the photo film carrier 20 for 135 type. The photo film carrier 20 is constituted by a carrier base member 30 and carrier cover member 31, between which a photo film passageway 32 is defined. The carrier cover member 31 is secured to the carrier base member 30 in an openable manner. When the carrier cover member 31 is opened, the photo film passageway 32 in the top of the carrier base ember 30 is uncovered.

Various elements are arranged in the photo film passageway 32 from an entrance 33, including a photo film end sensor 34, a first pair of feed rollers 35, dust eliminating rollers 38, a second pair of feed rollers 36, a mask member 39, a third pair of feed rollers 37 and a photo film reserving guide plate 40, in the order listed.

The photo film end sensor 34 detects insertion of a leading end of the photo film 23. A detection signal is output by the photo film end sensor 34, and sent to a controller that is not illustrated. A photo film conveying motor 43 is caused by the controller to rotate in a forward direction according to the detection signal. Timing belts 44–46 and pulleys transmit rotation of the photo film conveying motor 43 to the pairs of the feed rollers 35–37. The photo film 23 is conveyed in the forward direction through the photo film carrier 20, and reserved by the photo film reserving guide plate 40. The dust eliminating rollers 38 contact the photo film 23 and eliminate dust from the two surfaces of the photo film 23.

Roller shifter mechanisms 47 and 48 keep nip rollers in the second and third pairs of the feed rollers 36 and 37 shiftable up and down. The nip rollers, when shifted down, are in a nipped position, and when shifted up, are in a retracted position. The roller shifter mechanisms 47 and 48 shift the second and third pairs of the feed rollers 36 and 37 selectively to a nipped state for photo film conveyance. While the photo film 23 is conveyed in the direction A into the photo film carrier 20, the third pair of the feed rollers 37 is shifted in the nipped state. While the photo film 23 is conveyed in the direction B opposite to the direction A, the second pair of the feed rollers 36 is shifted in the nipped state.

Figure 4:
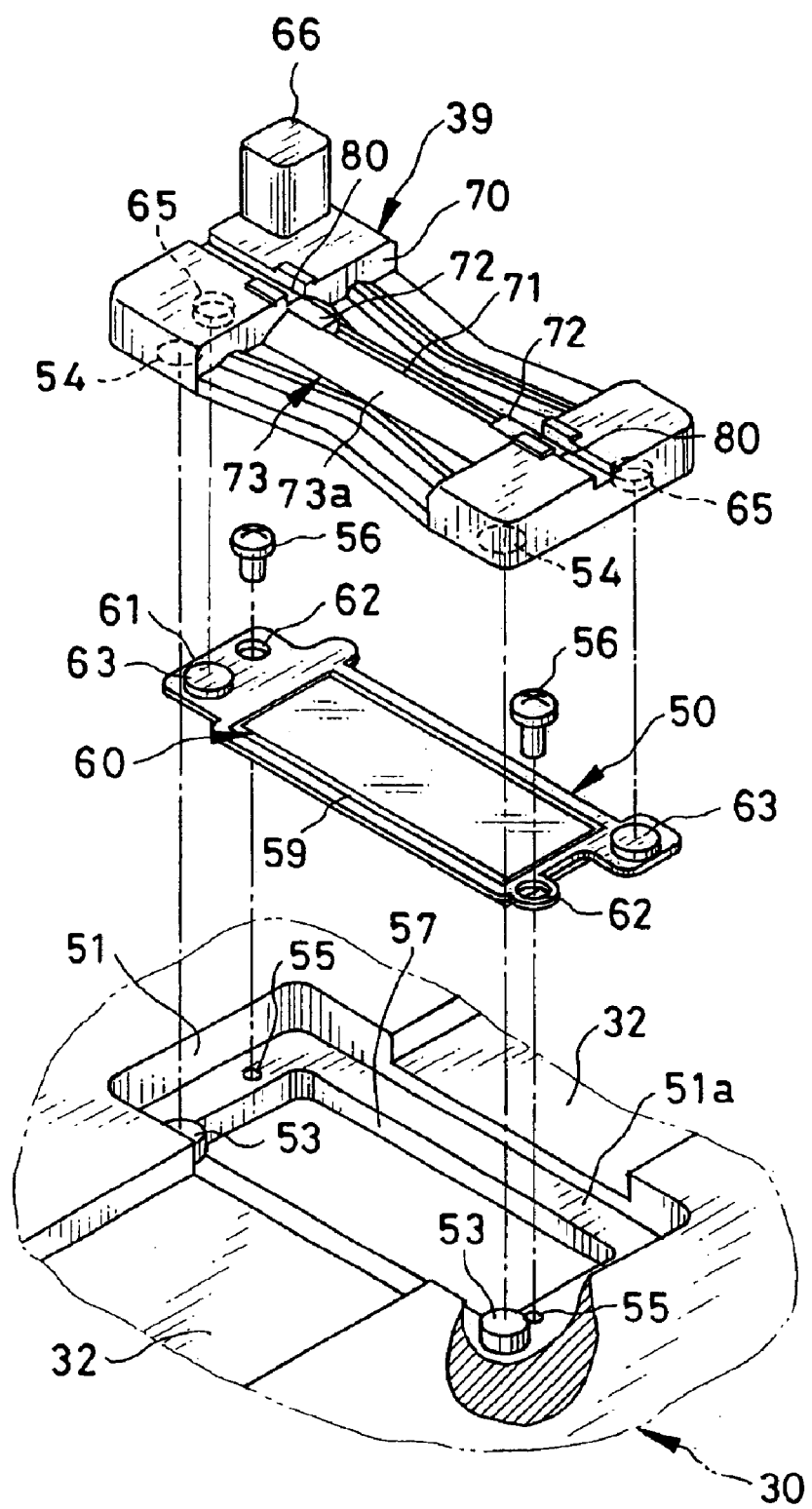
FIG. 4 is an exploded perspective illustrating a photo film passageway and a mask member in the line CCD scanner.

The mask member 39 is disposed between the second and third pairs of the feed rollers 36 and 37 in the middle of the photo film carrier 20. In FIG. 4, receiving channels 51 are formed in the carrier base member 30, and receive insertion of the mask member 39 in a removable manner.

The receiving channels 51 are formed in the middle of the photo film passageway 32 and disposed in the center of the carrier base member 30 of the photo film carrier 20. A diffuser plate 50 and the mask member 39 are fitted inside the receiving channels 51. A bottom face 51a of the receiving channels 51 has two positioning pins 53 projecting upwards. The positioning pins 53 are inserted in positioning holes 54 in the mask member 39. Screw holes 55 are formed in the bottom face 51a. Fastening screws 56 are used to fasten the diffuser plate 50 at the screw holes 55. A carrier opening 57 is formed in the center of the combination of the receiving channels 51, and guides light from the light source 21 toward the photo film 23. See FIG. 2.

Figure 5:
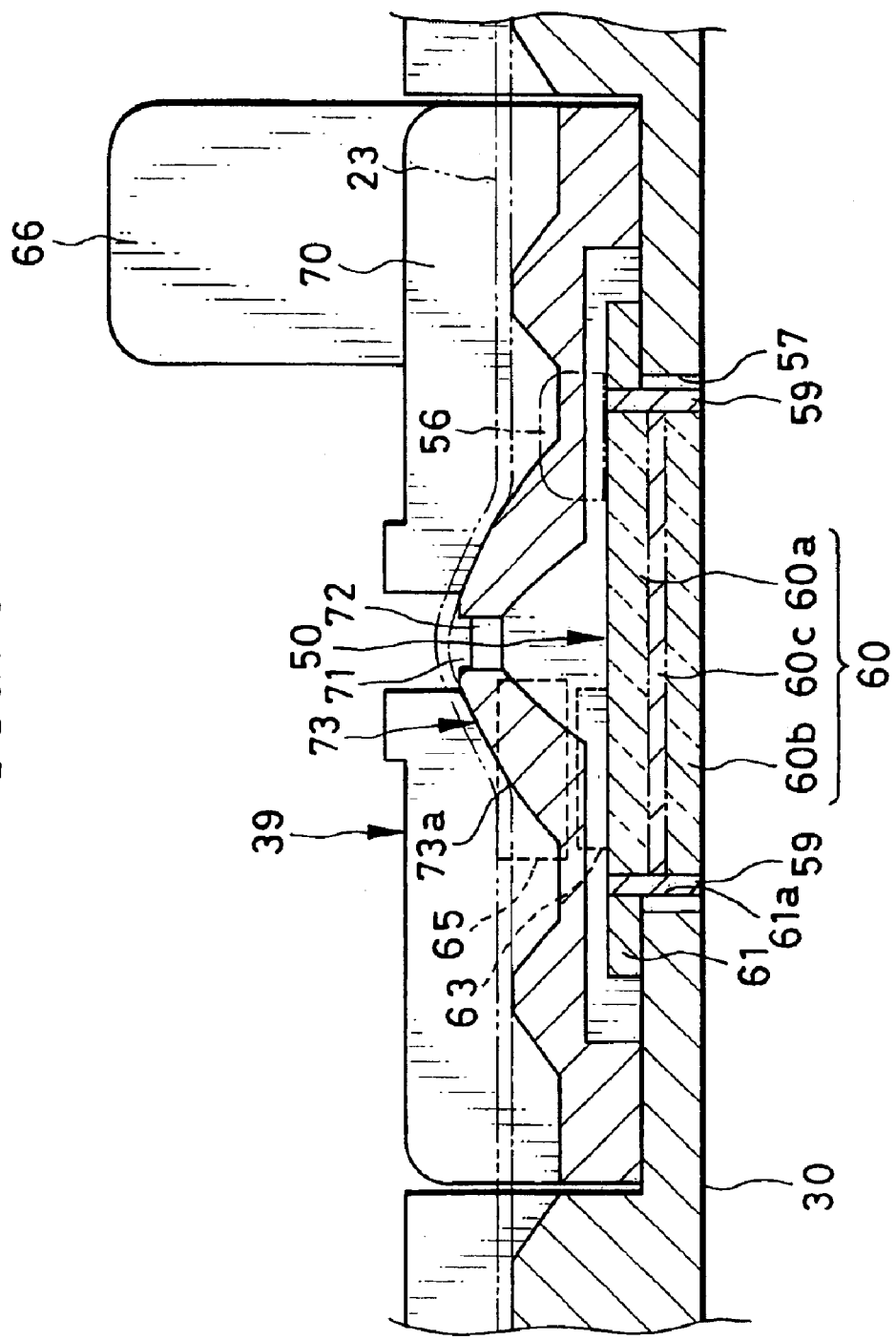
FIG. 5 is a cross section illustrating the same as FIG. 4 but in an assembled state.

The diffuser plate 50 is constituted by a triple-layered plate 60 and frame 61. In FIG. 5, the triple-layered plate 60 includes a diffuser plate element 60c and two glass plates 60a and 60b for sandwiching the same. A receiving opening 61a is formed in the frame 61, and receives the triple-layered plate 60, which is attached to the frame 61 by use of sealing agent 59. The sealing agent 59 is filled in positions of all the periphery of the triple-layered plate 60, and avoids entry of dust into the light diffuser box 27.

In FIG. 4, there are receiving holes 62 and attraction brackets 63 in ends of the frame 61. The attraction brackets 63 include metal disks to be attracted magnetically, and are fixed on the frame 61.

The mask member 39 has a size insertable in the receiving channels 51, and has the positioning holes 54 in its bottom. Retainer magnets 65 or permanent magnets are secured to the mask member 39 in positions opposed to the attraction brackets 63. The retainer magnets 65 attract the attraction brackets 63 to retain the mask member 39 tightly to the receiving channels 51. In the tightly retained state, the mask member 39 is kept immovable on the carrier base member 30 by the engagement between the positioning pins 53 and positioning holes 54.

A grip 66 projects from a top face of the mask member 39 at its one corner. The mask member 39 can be easily removed from the carrier base member 30 by grasping and lifting the grip 66.

A passage recess 70 is formed in the top wall of the mask member 39 in a channel shape as viewed in section. The passage recess 70 communicates with the photo film passageway 32 in the carrier base member 30 in a state of retention of the mask member 39 in the receiving channels 51. A mask slit 71 is formed narrowly in the mask member 39 in the middle of the photo film passageway 32, and extends in the width direction of the photo film 23. The mask slit 71 has a length greater than a width of the passage recess 70.

Light-reducing ND filters 72 are secured to respectively ends of the mask slit 71, and positioned at perforations in the photo film 23 of 135 type. The ND filters 72 operate to reduce light. The ND filters 72 are constituted by a glass plate and aluminum deposit layer formed on the glass plate by vacuum deposition. The ND filters 72 are oriented in the mask slit 71 to direct the aluminum deposit layer downwards. Furthermore, an AR coating is applied to the aluminum layer for the purpose of avoiding reflecting or flare.

Figure 6:
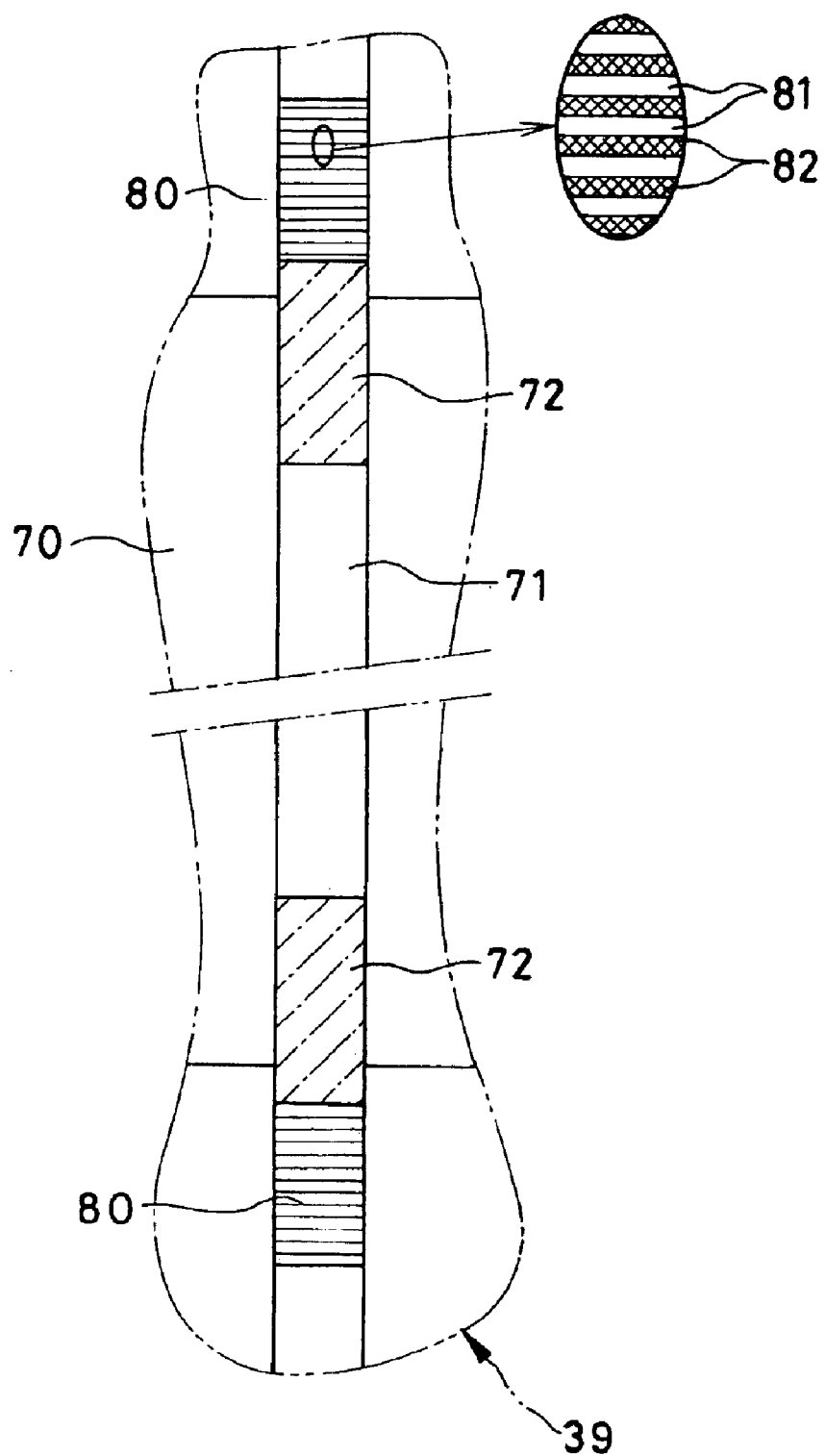
FIG. 6 is an explanatory view in plan, illustrating a mask slit in combination with auto focus charts.

In FIG. 6, there are first and second auto focus (AF) charts 80 disposed on outer sides of the ND filters 72. The auto focus charts 80 have a minute printed pattern including stripes 81 that extend in the sub scan direction perpendicular to the shape of the mask slit 71 as an auto focus (AF) pattern. The auto focus charts 80 are picked up by the line CCD scanner 11 for the purpose of detection of failure in the orientation of the mask member 39, and focusing of the pick-up lens unit 28.

In FIG. 5, a middle portion of the mask slit 71 is open to be opposed to a portion of the photo film 23 with an image recorded, and not closed by a glass plate or the like. Dust or the like stuck to the photo film 23, therefore, drops down through the mask slit 71 when it reaches the mask slit 71. The dust is prevented from remaining in the vicinity of a photo film plane focused for the image recording. No streak in the manner of electrical noise due to the dust will be included in the image being read. The dust comes to lie on the diffuser plate 50, but is sufficiently distant from the photo film 23, and does not cause streak or stain in the image being read. The distance from the dust to the photo film plane causes the dust to be in-focus with reference to the pick-up lens unit 28, and keeps the dust from influencing the image reading.

Two positioning protrusion ridges 73 are disposed to project from edges of the mask slit 71, and extends in the width direction of the photo film. A cylindrical curved surface 73a is formed with each of the protrusion ridges 73, and push the photo film 23 in a curved manner in the conveying direction. Thus, the photo film 23 is flattened at the reading point without flexing in the width direction (main scan direction). Thus, the precision in reading the photo film 23 is improved. Note that a section for passing light in the photo film carrier 20 is constituted by the mask member 39, diffuser plate 50 and receiving channels 51.

As illustrated in FIG. 2, a focusing unit 85 is used to detect an unacceptable orientation of the mask member 39 due to failure in the securing. The focusing unit 85 is constituted by the image processor 12, a focus adjuster 86, a driver 87 and the lens driving motor 19. The focus adjuster 86 adjusts the focusing of the pick-up lens unit 28, and also evaluates the orientation of the mask member 39.

Figure 7:
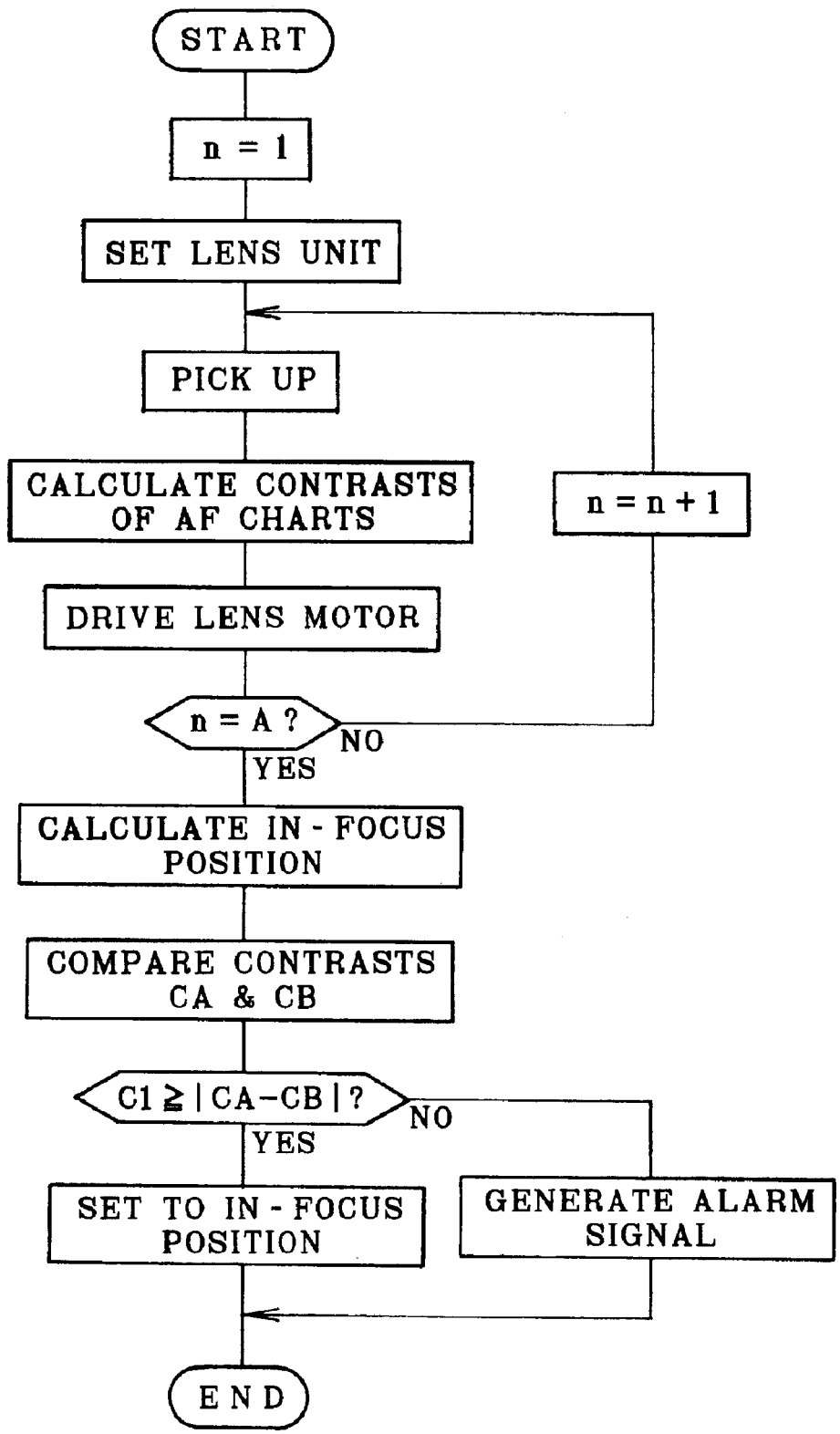
FIG. 7 is a flow chart illustrating processes of auto focusing and checking orientation of the mask member.

In FIG. 7, a flow for a focusing process and failure detecting process is depicted. At first, the focus adjuster 86 sets the pick-up lens unit 28 in an initial position that is a lowest position in a focus adjusting range, and causes the driver 87 to rotate the lens driving motor 19 at a regular amount, and shifts the pick-up lens unit 28 upwards at a constant step. At each time of the stepwise movement, image data of the auto focus charts 80 according to the line CCD 29 is obtained from the image processor 12. Then the focus adjuster 86 obtains a contrast between the stripes 81 and blank ground portions 82 in the auto focus pattern of the auto focus charts 80 according to the image data of the auto focus charts 80. It is preferable that a level where the auto focus charts 80 is disposed should be at a level of an image recording surface of the photo film.

The contrasts derived from the auto focus charts 80 in the both positions are obtained at each time of stepwise movement, and is stored. When the pick-up lens unit 28 is set to an uppermost position in the focus adjusting range after the stepwise movement, the stepwise movement is terminated. A lens position where the contrast CA derived from one of the auto focus charts 80 is maximized is obtained as an in-focus lens position. When the in-focus lens position is obtained, the contrast CA is compared with a contrast CB derived from the remaining one of the auto focus charts 80, to determine an absolute value |CA−CB| of a difference between the contrasts. If the absolute value |CA−CB| of the contrast difference is equal to or less than a predetermined value C1, then it is determined that the mask member 39 is normally secured to the carrier base member 30 in an orientation parallel to a reference line. The pick-up lens unit 28 is set in the in-focus position before the focusing process is ended. If in turn the absolute value |CA−CB| of the contrast difference is more than the predetermined value C1, then it is determined that there is failure or an inclination in orienting the mask member 39. An alarm signal is generated to inform operators or users of the unacceptably secured orientation in a visible or audible manner. Thus, the checking of orientation of the mask member 39 is facilitated.

The operation of the above embodiment is described now. In FIG. 3, the photo film 23 is set in the entrance 33 of the photo film carrier 20. Upon insertion of the leading end of the photo film 23, the photo film conveying motor 43 starts rotation. The first and third pairs of the feed rollers 35 and 37 convey the photo film 23 in the direction A to advance the photo film 23 in the photo film carrier 20. When the photo film 23 moves past the mask slit 71 in the mask member 39, the line CCD 29 reads an image of a frame and a bar code from the photo film 23. See FIG. 2. At the time of this photo film advance in the direction A, prescanning is effected. At the time of return of the photo film in the direction B, fine scanning is effected. The prescanning is provisional reading of the frame image, to determine reading conditions according to density and the like of the frame image, the reading conditions including an amount of illuminating light applied to the frame, and charge storing time in the CCD. The fine scanning is reading of the frame image with high precision according to the reading conditions determined by the prescanning.

Dust may be stuck on the photo film 23. In the course of the image reading, the dust is caused to drop through the mask slit 71 without remaining in the mask slit 71. The dust dropped to the diffuser plate 50 is not focused in the image reading, as there is a sufficient distance between the diffuser plate 50 and photo film 23. No electrical noise due to the dust occurs in pick-up data.

The portions of the mask member 39 along the edges of the mask slit 71 have the curved surface 73a in the cylindrical shape, which changes the photo film 23 in movement from the flat shape to the curved shape. If dust is stuck to the photo film 23, separability of the dust from the photo film 23 is increased by the curved surface 73a. The dust can drop through the mask slit 71 reliably. Therefore, even dust that has not been eliminated by the dust eliminating rollers 38 can be eliminated, to avoid streak or stain in the image being read.

Figure 8:
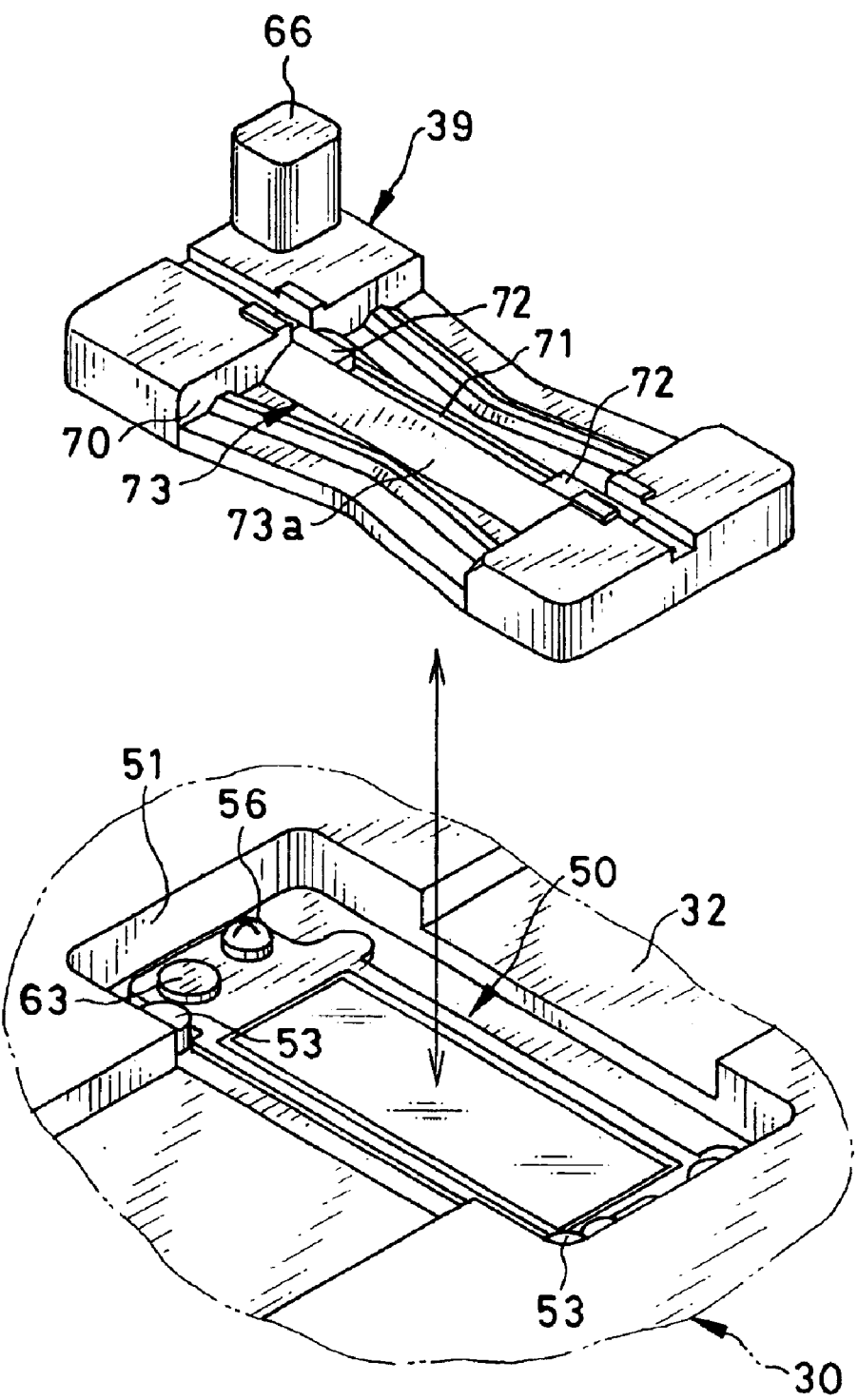
FIG. 8 is an exploded perspective illustrating the same as FIGS. 4 and 5 but in which a diffuser plate is secured.

Before or after the image reading, the carrier cover member 31 of the photo film carrier 20 is opened. In FIG. 8, dust collected on the diffuser plate 50 can be eliminated after removing the mask member 39 from the carrier base member 30 by lifting the grip 66. Also, the mask member 39 is retained on the carrier base member 30 by the attraction of the retainer magnets 65. Thus the mask member 39 can be removed easily. The mask member 39, as kept from moving by the positioning pins 53 during the attraction by the retainer magnets 65, is kept from offsetting inside the receiving channels 51.

Before the input apparatus 13 reads the photo film, the auto focus charts 80 are picked up, to detect whether or not the mask member 39 is properly positioned. The pick-up lens unit 28 is shifted to its in-focus position according to pick-up data of the auto focus charts 80. If there is a sufficient difference between the contrasts of the auto focus charts 80 in comparison with the predetermined lower limit, then the mask member 39 is detected to have an inclination with respect to the carrier base member 30. Then sound, light or other signals of alarm are generated for warning unacceptability. Thus, the mask member 39 can be secured properly to the carrier base member 30 even if the mask member 39 is removed by maintenance or other operation. This can prevent failure in the image reading due to the failure in the orientation.

In the above embodiment, the mask member 39 is prevented by the positioning pins 53 from moving between the receiving channels 51. However, another structure for preventing movement may be added to it, or substituted for it, to fit the mask member 39 in the receiving channels 51 tightly.

In the above embodiment, the retainer magnets 65 are a permanent magnet. Alternatively, an electromagnet may be used. In the above embodiment, the retainer magnets 65 are incorporated in the mask member 39. Instead, magnets may be disposed in the frame 61 of the diffuser plate 50 or in the receiving channels 51 on a side opposed to the mask member 39. In the above embodiment, the mask member 39 is fixedly retained in the receiving channels 51 by the magnetic attraction. However, another locking or retaining structure may be added to it, or substituted for it, in order to retain the mask member 39. Examples of locking or retaining structures may be pins for protruding to retain the mask member 39, or squeezing members for retaining the mask member 39 to the receiving channels 51.

Also, it is possible to mount the mask member 39 in the receiving channels 51 without any such locking or retaining structures. Specifically, a fitted state of the mask member 39 in the receiving channels 51 may be considerably tight so that the mask member 39 can be kept immovable in a normal use.

In the above embodiment, the mask member 39 and diffuser plate 50 are components removably secured to each other. However, the diffuser plate 50 may be incorporated in the mask member 39. It is possible to remove the diffuser plate 50 from the photo film carrier by removing the mask member 39 from the carrier base member 30. Both the mask member 39 and diffuser plate 50 can be cleaned easily.

In the above embodiment, the diffuser plate 50 is fastened to the receiving channels 51 by use of the screws. Alternatively, magnetic attraction may be used for retaining the diffuser plate 50 removably to the receiving channels 51. Positioning pins may be used for positioning the diffuser plate 50 in the receiving channels 51.

Figure 9:
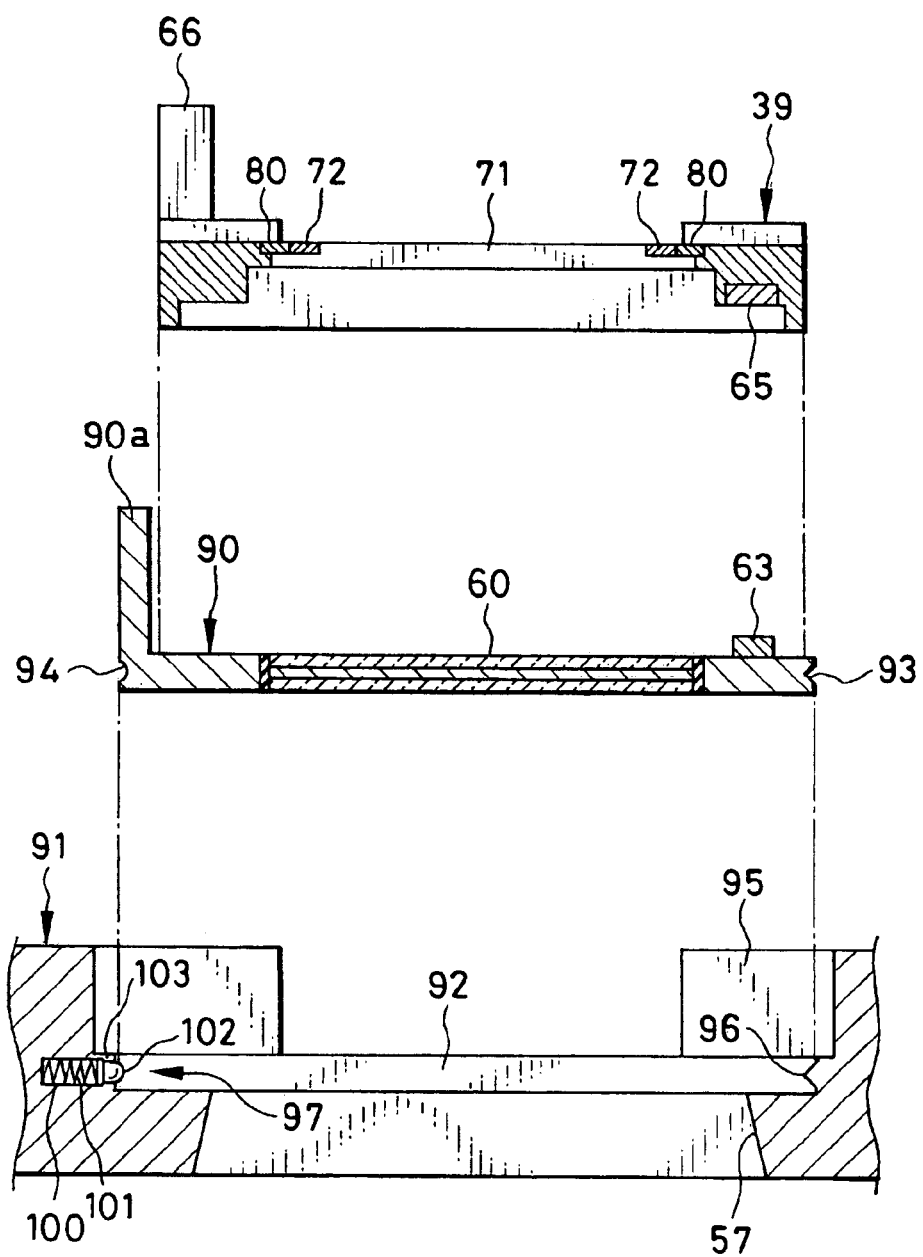
FIG. 9 is an explanatory view in a cross section, illustrating another preferred embodiment in which a diffuser plate is removably secured by an engaging mechanism.
Figure 10:
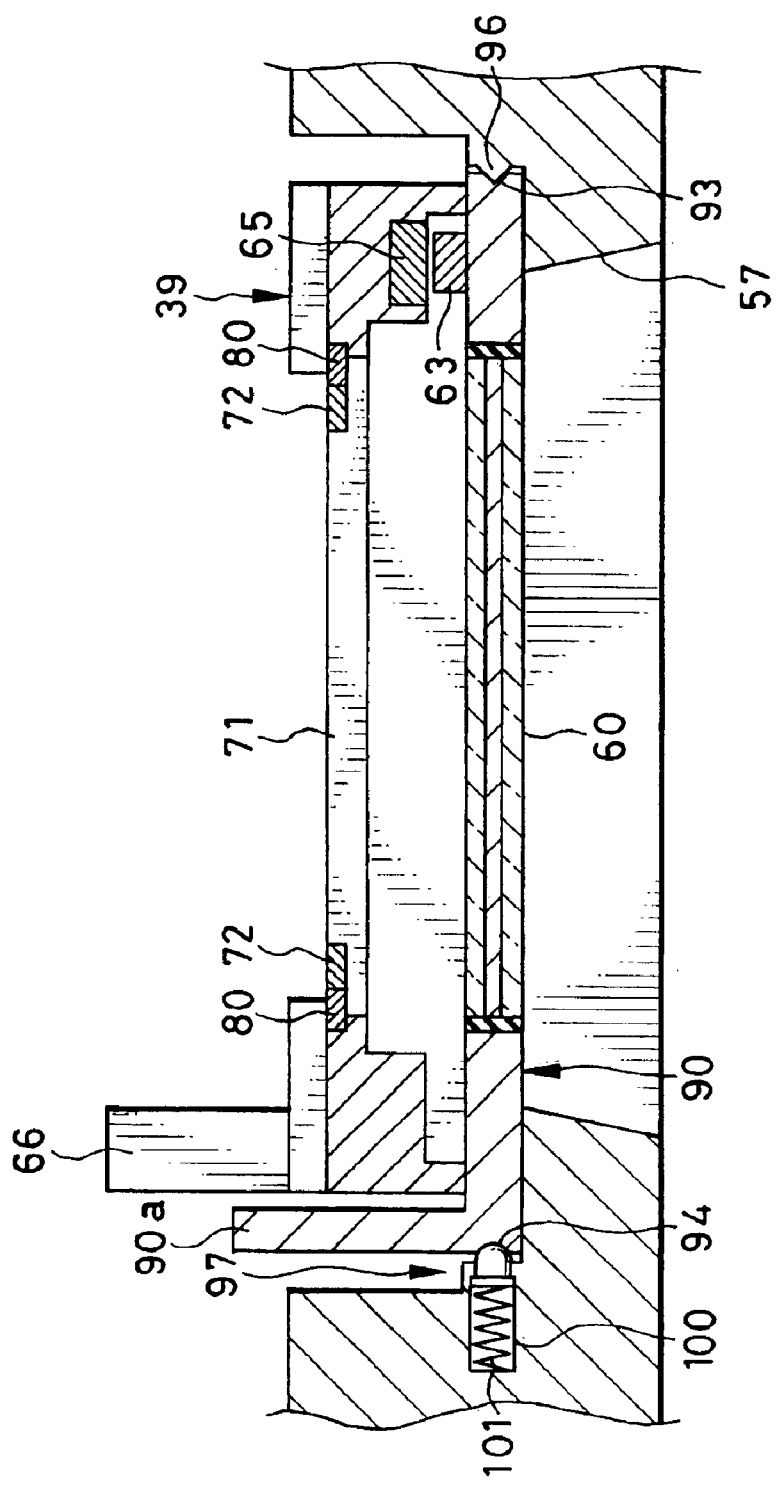
FIG. 10 is a cross section illustrating the same as FIG. 9 but in an assembled state.

In FIGS. 9 and 10, another preferred embodiment is illustrated, in which a diffuser plate 90 is removably secured to a carrier base member 91 by retention with a click. Elements similar to those in FIG. 4 are designated with identical reference numerals. A grip 90*a* is disposed to project from the diffuser plate 90. Receiving channels 92 are formed in the carrier base member 91 to support the diffuser plate 90. When the grip 90*a* is pinched by fingers, the carrier base member 91 can be easily loaded in or unloaded from the receiving channels 92. A positioning notch 93 is formed in an edge of the diffuser plate 90 in a conical shape. A retainer notch 94 is formed in an edge of the diffuser plate 90 opposite to the positioning notch 93, and has a semispherical shape.

Receiving channels 95 are formed in the carrier base member 91 for the mask member 39, and extend from tops of the receiving channels 92. A positioning projection 96 protrudes from an inner edge of the receiving channels 92. A retainer mechanism 97 is disposed on an inner edge of the receiving channels 92 opposite to that having the positioning projection 96. The retainer mechanism 97 includes a chamber 100, coil spring 101, retainer pin 102 and hole-formed panel 103. The coil spring 101 and retainer pin 102 are contained in the chamber 100. The hole-formed panel 103 closes an opening of the chamber 100. The retainer pin 102 is biased by the coil spring 101 toward the positioning projection 96. The hole-formed panel 103 keeps the retainer pin 102 from dropping away from the chamber 100.

The diffuser plate 90 is secured by the following process. At first, the positioning notch 93 is positioned at the positioning projection 96 while the diffuser plate 90 becomes inserted in the receiving channels 92. Then the diffuser plate 90 is rotated about the positioning projection 96, until the retainer pin 102 in the retainer mechanism 97 is retained in the retainer notch 94. In FIG. 10, the diffuser plate 90 is firmly secured by the retainer mechanism 97. At the time of removing the diffuser plate 90, the grip 90*a* is pinched by a user to lift the diffuser plate 90. The retention with the click is disengaged by this manual operation, the diffuser plate 90 being removed easily from the receiving channels 92. Note that it is possible suitably to change the shapes of the positioning notch 93 and positioning projection 96 and the structure of the retainer mechanism 97. This removable structure of the diffuser plate 90 makes it possible to clean up the lower face of the diffuser plate 90 in addition to its upper face.

The retainer notch 94 and retainer pin 102 may be plural combinations of notches and pins. Also, the retainer notch 94 may be a slot extending in the sub scan direction or length direction of the photo film. The retainer pin 102, in combination with this, may be a plate extending in the sub scan direction. Furthermore, it is possible to provide the diffuser plate 90 with the retainer mechanism 97 including the retainer pin 102, and provide the receiving channels 92 with the retainer notch 94.

In the above embodiment, the photo film 23 is 135 type. However, the photo film carrier in the present invention may be for other types of photo films including IX 240 type, 110 type, 120 type, 220 type and the like. In the photo film carrier, widths of the photo film passageway and feed rollers can be determined according to the width of the photo film to be used.

Figure 11:
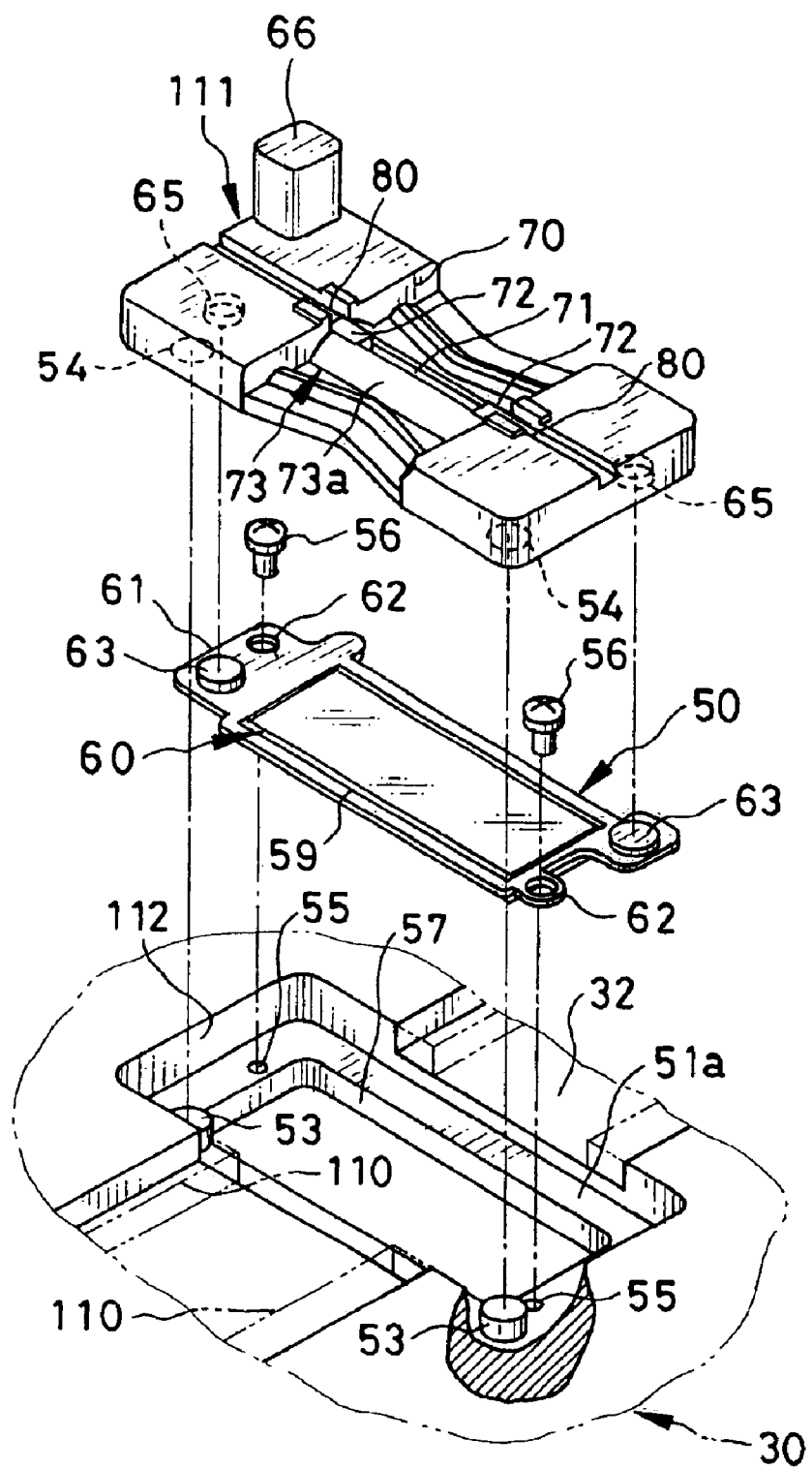
FIG. 11 is an exploded perspective illustrating still another preferred embodiment in which a changeable photo film carrier is combined with an additional mask member.

Instead of the above photo film carrier specified for the single photo film type, a photo film carrier in the present invention may be a changeable type usable both for 135 type and for IX 240 type. In FIG. 11, a photo film passageway is provided with movable guide members 110 that are shiftable for 135 type and IX 240 type. When the IX 240 type is used, a mask member 111 is set between receiving channels 112. The mask member 111 is structured fundamentally in the same manner as the mask member 39 for 135 type in FIG. 4. 135 type and IX 240 type are different in the photo film width, positions of perforations and positions of image frames. In associated with this, the mask members 39 and 111 are different in the width of the photo film passageway, and positions and a size of the ND filters. Note that elements similar to those in FIG. 4 are designated with identical reference numerals. In the present embodiment, the movable guide members 110 are used. Instead, two photo film passageways (not illustrated) may be formed. The photo film reading section may be single, but can be supplied with the photo film by the photo film passageways commonly.

In the above embodiment, the auto focus charts 80 are picked up to detect failure in the orientation of the mask member 39. Furthermore, focusing and detection of failure in orientation may be effected according to information of a distance to the auto focus charts 80 or to the mask member 39. For example, a rangefinding sensor can be used to obtain two distances from the pick-up lens unit 28 to ends of the mask member 39 in the photo film width direction. If the two distances are different between the ends, it is possible to detect failure in the orientation of the mask member 39.

In the above embodiment, the contrast is obtained in all the stepwise positions of the pick-up lens unit 28. However, the focusing may be effected by monitoring increase in the contrast, and stopping the shift of the pick-up lens unit 28 when the contrast becomes maximum. For such a case, the failure in the orientation is checked after the focusing.

Although the contrast detecting system is used according to the above embodiment for the auto focusing, any suitable system may be used in the line CCD scanner according to the present invention. The detection of the failure in the orientation of the mask member 39 may be effected by any manner irrespective of the auto focusing.

In the present specification, the term of removable is used to refer to an easily separable state without the use of a screwdriver or other tools, and possibility of removal by both users and professional operators for maintenance and repair.

In the present specification, the term of unfastening is used to mean separation by use of a screwdriver or other tools, and separation by professional operators for maintenance and repair, not normally by users.

Furthermore, an image area sensor may be used instead of the line CCD 29, to read images with CCD cells arranged in a matrix.

In the above embodiment, the mask member 39 has the passage recess 70. However, the mask member 39 may lack the passage recess 70. The photo film 23 may be conveyed directly on flat plate portions of the mask member 39.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An image reading device comprising:
   a photo film passageway for guiding and passing developed photo film;
   a light source for illuminating an image in said photo film positioned in said photo film passageway;
   a line image sensor for reading said image being illuminated when said photo film is being fed;
   a mask member, secured to said photo film passageway, and on which said photo film is passed; and
   a mask opening, formed in said mask member, for directing light from said light source toward said photo film;
   wherein said mask opening is a mask slit extending in a width direction of said photo film, so that said mask slit is longer in said width direction of said photo film than a passing direction of said photo film.

2. An image reading device as defined in claim 1, wherein said mask member is removably secured to said photo film passageway.

3. An image reading device as defined in claim 2, further comprising a photo film carrier having said photo film passageway;
   wherein said photo film carrier includes a feed roller for conveying said photo film in a longitudinal direction thereof, said image being read by said image sensor line by line while said feed roller conveys said photo film.

4. An image reading device as defined in claim 3, further comprising a protrusion portion disposed on said mask member to extend in said width direction of said photo film, provided with said mask slit formed in a middle thereof, for flexing said photo film in said longitudinal direction to remove flexing in said width direction.

5. An image reading device as defined in claim 4, wherein said protrusion portion comprises a cylindrical ridge.

6. An image reading device as defined in claim 3, wherein said photo film carrier includes:
   a carrier base member, disposed nearer to said light source, provided with said mask member secured thereto, and having a carrier opening for introducing said light from said light source; and
   a carrier cover member for covering said carrier base member at least partially, said photo film passageway being defined between said carrier cover member and said carrier base member;
   further comprising a diffuser plate, secured to said carrier base member, for diffusing said light directed from said light source toward said mask member.

7. An image reading device as defined in claim 6, further comprising a passage recess, formed in said mask member, extended to said photo film passageway, for guiding said photo film.

8. An image reading device as defined in claim 6, further comprising a retainer member for removably said mask member to said carrier base member.

9. An image reading device as defined in claim 8, wherein said retainer member comprises a portion for effecting retention with a click.

10. An image reading device as defined in claim 8, wherein said retainer member is secured to one of said diffuser plate or said carrier base member and said mask member, for retention by magnetic attraction of one portion of a remaining one of said diffuser plate or said carrier base member and said mask member.

11. An image reading device as defined in claim 10, further comprising:
    at least one positioning hole formed in one of said carrier base member or said diffuser plate and said mask member; and
    at least one positioning pin, disposed to protrude from a remaining one of said carrier base member or said diffuser plate and said mask member, fitted in said positioning hole, for positioning said mask member on said carrier base member or said diffuser plate.

12. An image reading device as defined in claim 6, further comprising a retainer member for retaining said diffuser plate removably to said carrier base member.

13. An image reading device as defined in claim 6, further comprising a fastening member for immovably fastening said diffuser plate to said carrier base member, said fastening member being separable by external operation, and allowing removal of said diffuser plate.

14. An image reading device as defined in claim 6, wherein said light source is disposed under said photo film passageway, said diffuser plate and said mask member are disposed to define a predetermined space therebetween, and dust on said photo film is dropped into said space.

15. An image reading device as defined in claim 6, wherein said photo film is a selected one of at least first and second types;
    said mask member is a selected one of at least first and second mask members associated with respectively said first and second types, and secured to said photo film passageway selectively.

16. An image reading device as defined in claim 15, wherein said first and second types have widths different from one another, and said first and second types have said mask slit with a length different therebetween.

17. An image reading device as defined in claim 6, further comprising:
    first and second auto focus charts, disposed at respectively first and second ends of said mask slit as viewed in said width direction of said photo film, having an auto focus pattern common therebetween and adapted to focusing of a pick-up lens;
    said image sensor picking up said first and second auto focus charts, for obtaining first and second pick-up information;
    a control unit for obtaining contrasts of said first and second auto focus charts according to said first and second pick-up information, for detecting abnormality in an orientation of said mask member on said carrier base member if said contrasts have a difference beyond a tolerable range with said pick-up lens set in-focus, and for generating an alarm signal.

18. The image reading device of claim 1, wherein the mask member transmits light to less than 50% of a frame of the photo film at a time.

19. An image reading device comprising:

a photo film passageway for guiding and passing developed photo film;

a light source for illuminating an image in said photo film positioned in said photo film passageway;

an image sensor for reading said image being illuminated;

a mask member, secured to said photo film passageway, and on which said photo film is passed;

a mask slit extending in a width direction of said photo film, formed in said mask member, for directing light from said light source toward said photo film;

a photo film carrier having said photo film passageway;

a carrier base member, disposed nearer to said light source, provided with said mask member secured thereto, and having a carrier opening for introducing said light from said light source;

a carrier cover member for covering said carrier base member at least partially, said photo film passageway being defined between said carrier cover member and said carrier base member;

first and second auto focus charts, disposed at respectively first and second ends of said mask slit as viewed in said width direction of said photo film, having an auto focus pattern common therebetween and adapted to focusing of a pick-up lens;

said image sensor picking up said first and second auto focus charts, for obtaining first and second pick-up information; and a control unit for obtaining contrasts of said first and second auto focus charts according to said first and second pick-up information, for detecting abnormality in an orientation of said mask member on said carrier base member if said contrasts have a difference beyond a tolerable range with said pick-up lens set in-focus, and for generating an alarm signal.

20. An image reading device comprising:

a photo film passageway for guiding and passing developed photo film;

a light source for illuminating an image in said photo film positioned in said photo film passageway;

a line image sensor for reading said image being illuminated when said photo film is being fed;

a mask member, secured to said photo film passageway, and on which said photo film is passed;

a mask slit extending in a width direction of said photo film, so that said mask slit is longer in said width direction of said photo film than a passing direction of said photo film, formed in said mask member, for directing light from said light source toward said photo film; and a protrusion portion disposed on said mask member to extend in said width direction of said photo film, provided with said mask slit formed in a middle thereof, for flexing said photo film in said longitudinal direction to remove flexing in said width direction.

21. An image reading device comprising:

a photo film passageway for guiding and passing developed photo film;

a light source for illuminating an image in said photo film positioned in said photo film passageway;

an image sensor for reading said image being illuminated;

a mask member, secured to said photo film passageway, and on which said photo film is passed;

a mask slit extending in a width direction of said photo film, formed in said mask member, for directing light from said light source toward said photo film;

first and second auto focus charts, disposed at respectively first and second ends of said mask slit as viewed in said width direction of said photo film, having an auto focus pattern common therebetween and adapted to focusing of a pick-up lens;

said image sensor picking up said first and second auto focus charts, for obtaining first and second pick-up information; and a control unit for obtaining contrasts of said first and second auto focus charts according to said first and second pick-up information, for detecting abnormality in an orientation of said mask member if said contrasts have a difference beyond a tolerable range with said pick-up lens set in-focus.

* * * * *